April 27, 1943.  H. M. GUINOT  2,317,758
TREATMENT OF ACETIC ACID
Filed Feb. 19, 1940
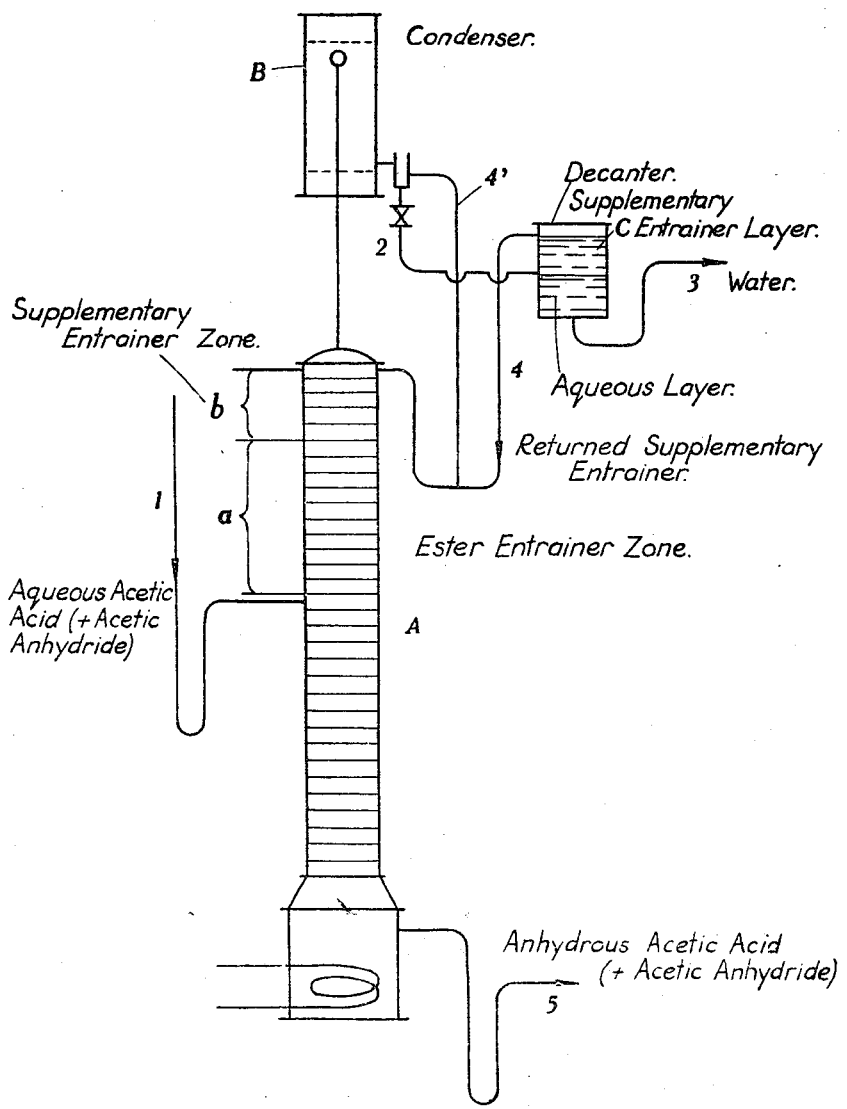
Inventor
Henri M. Guinot,
by
Attorney Patented Apr. 27, 1943

2,317,758

UNITED STATES PATENT OFFICE 2,317,758

TREATMENT OF ACETIC ACID

Henri Martin Guinot, Niort, France; vested in the Alien Property Custodian

Application February 19, 1940, Serial No. 319,762
In France March 4, 1939

2 Claims. (Cl. 202—42)

This invention relates to the treatment of acetic acid and more particularly to the dehydration of acetic acid or mixtures of acetic acid and acetic anhydride.

It is known to dehydrate aqueous acetic acid solutions by distillation in the presence of liquids very slightly soluble in water and generally known as entrainers. The acetic acid remains as a tail product, whereas the water distills with the entrainer liquid in the form of a hetero-azeotropic mixture which decants, and thus allows the easy separation of the water, which is thrown away.

When care is taken to choose as an entrainer liquid, a liquid only slightly soluble in water and furthermore not having any tendency to give azeotropic mixtures with the anhydrous acetic acid, it is observed that the hetero-azeotropic mixture of water and entrainer can be obtained absolutely free from acetic acid, which is of great interest from the industrial point of view.

The mixture of acetic acid and acetic anhydride resulting from the pyrolysis of acetic acid may similarly be dehydrated in an analogous manner. However the problem in this case is substantially more complex because of the tendency possessed by the acetic anhydride to become hydrolised when heated, and to revert to the acid. One must therefore choose entrainer liquids which have a boiling point sufficiently low to reduce the boiling point of the mixture to a minimum, and which do not form an azeotropic mixture with the acetic acid or with the anhydride.

It has been found that the acetic esters such as ethyl acetate or propyl and isopropyl acetates comply with these different conditions and their use has already been described for the treatment of aqueous acetic acid solutions and for mixtures of acetic anhydride, acetic acid and water.

Now these entrainer liquids, and above all ethyl acetate, have the property of dissolving a relatively large quantity of water, so that the water carried away in the heteroazeotropic mixture cannot be entirely separated from the condensed mixture by decantation. Thus of the 7% of water which are contained in the water-ethyl acetate binary mixture, only 4.5% are found in the lower layer upon decantation, the remainder being retained in solution in the upper layer of entrainer. This property is disadvantageous since it is necessary, to compensate for this lack of efficiency of the entrainer liquid, either to increase considerably the amount of reflux to effect complete dehydration, which necessitates an increased expenditure of heat, or to dehydrate the layer of entrainer liquid from the decanter by known means, for example, by distillation, before returning it to the dehydration column. Furthermore the presence of impurities which are very soluble in water, such as acetone or acetaldehyde, and which are always found in the pyrolysis products of acetic acid and in certain industrial acetic acid solutions, rapidly increases the solubility of the water in the ester and prevents a normal decantation of the hetero-azeotropic water-ester mixture, so that dehydration rapidly becomes impossible unless additional steps are taken to dehydrate the entrainer from the decanter, or fresh entrainer is used.

Now it has been found that it is possible to prevent the contamination of the ester entrainer with water and to avoid the above mentioned disadvantages by using a supplementary entrainer together with the ester, or principal entrainer, in dehydrating acetic acid or mixtures of acetic acid and acetic anhydride. This supplementary entrainer must be practically insoluble in water and it must also be capable of forming with water, or with water and the ester entrainer, a hetero-azeotropic mixture having a boiling point lower than that of the hetero-azeotropic mixture formed by the ester entrainer and water.

Substances which are suitable for use as supplementary entrainers are found among the aliphatic and aromatic hydrocarbons. For example a petroleum distillate having a boiling point between very narrow limits, for instance, between 84–85° C., is particularly suitable for carrying out the present invention. Such substances remove all the water from the distillation column in the form of a hetero-azeotropic mixture, and give very good separation, upon decantation, because of their high degree of insolubility in water.

Some hydrocarbons, e. g. cyclohexane, form a ternary azeotropic mixture with water and the ester entrainer which has a lower boiling point than any other mixture or substance in the distillation column. The presence of ester in the vapours leaving the column has in this case, no disadvantage from the point of view of the present invention, since, upon decantation practically all the ester entrainer is found in the same layer as the supplementary entrainer.

When suitable entrainers have been selected, according to the foregoing indications, and have been introduced once for all in suitable amounts into a distillation column, which is continuously fed with acetic solutions, and this column is in a state of normal operation (see below) two zones form therein, above the supply of liquid to be dehydrated; in the lower of these zones, the ester entrainer operates, and the upper one, the supplementary entrainer, either alone or, in the case of a supplementary entrainer forming a ternary hetero-azeotropic mixture with water and ester entrainers, as the ternary mixture, operates. The phenomena occurring in each of these two zones, which are characteristic of the present invention, are explained in greater detail below.

The process of dehydrating aqueous acetic acid solutions or aqueous mixtures of acetic acid and acetic anhydride according to the present invention therefore consists in continuously distilling the acetic solution or mixture in the presence of a charge of entrainer placed once for all in the distillation column said charge being made up of an ester, or principal entrainer, and a supplementary entrainer which is insoluble in water and capable of forming with water, or with water and the ester entrainer, an azeotropic mixture boiling at a lower temperature than the azeotropic mixture formed by the ester entrainer and water, in such a manner that distinct zones of operation of the principal entrainer and the supplementary entrainer respectively, are formed.

The present invention also includes the various novel features and novel combinations of features which are set forth in the following more detailed description of the process, which is illustrated by the accompanying drawing.

A convenient quantity of an ester and of a supplementary entrainer are placed once for all in a dehydration column A of any known type to which there is supplied in a continuous manner, through the pipe 1, the mixture of water and acetic acid to be dehydrated (which may or may not contain the anhydride) and distillation is then effected. The vapours escaping from the top of the column are condensed in B from whence the condensed liquid flows through the pipe 2 into the decanter C where it separates into two layers; the aqueous layer (shown as the lower layer in the drawing) is withdrawn through the pipe 3, while the entrainer layer is totally refluxed to the top of the column in accordance with the usual technique of azeotropic distillation, in order to maintain constant the charge of entrainer. In case of need one can reflux directly to the top of the column, through the pipe 4', a fraction of the condensate.

When the apparatus is in a state of normal operation, there is formed in the column, above the supply of liquid to be dehydrated, two quite distinct zones:

1. A zone $a$ where the ester entrainer operates and forms an impenetrable barrier to the vapours of acetic acid (or anhydride) and completely prevents the acid (or anhydride) from rising towards the top of the column.

2. A zone $b$ where the supplementary entrainer operates. The role of this supplementary entrainer is to absorb the water carried by the ester entrainer situated on the underlying plates and to take it to the top of the column and from there to the condenser; after condensation of the vapours in this latter there is obtained in the decanter an excellent separation of the hetero-azeotropic mixture of water and supplementary entrainer (the only mixture which leaves the colmun) even if small quantities of substances very soluble in water such as acetone, acid aldehyde or methanol, are present. These substances would have impeded decantation in the case of an ester entrainer employed alone.

Another advantage of this mode of operation in which the supplementary entrainer and water leave the column, consists in the fact that the aqueous layer withdrawn from the decanter through the pipe 3, does not contain any trace of acetic acid (or anhydride) or of entrainer and may consequently be rejected. The dehydrated product (acetic acid or mixture of acid and anhydride) entirely freed from entrainer, flows away at the base of the column through the pipe 5.

As already stated a petroleum distillate boiling between very narrow temperature limits, for example 84–85°, is particularly suitable as a supplementary entrainer for carrying out the process of the present invention. Such a petroleum distillate entrains 6.5% of water which separates out totally in the decanter; it thus permits an extremely efficacious dehydration to take place. When using such a petroleum distillate the existence in the column of the two operating zones mentioned above, is extremely well defined, so that the condensed vapours do not contain any trace of ester entrainer.

However, as indicated above, it is possible to carry out the process of the present invention satisfactorily when some ester entrainer does pass over with the vapour leaving the column, as when the supplementary entrainer is cyclohexane, the boiling point of which is 80.75° and which, at ordinary pressure, gives rise to an azeotrope boiling at 68.95° with water and containing 9% of water. In the presence of ethyl acetate, cyclohexane is, in fact, capable of giving rise to a cyclohexane-ethyl-acetate-water ternary mixture boiling at only 63.5–64°; this mixture contains 45% of ethyl acetate and 6.8% of water.

When using cyclohexane and ethyl acetate, therefore, it is the ternary hetero-azeotropic mixture which is formed on the upper plates of the column above the zone where the water-ethyl acetate binary mixture is found, which boils at 70.45°.

In spite of the presence of ethyl acetate in the condensed mixture there is obtained an excellent decantation, owing to the insolubility of cyclohexane in water, which gives rise to an aqueous layer containing practically no entrainer in solution and consequently being capable of being directly rejected without preliminary recovery. It may, however, sometimes occur, that when ternary azeotropic mixtures are formed, the amount of ester entrainer in the aqueous layer formed by decantation, is such that this layer cannot be directly rejected. In such a case the aqueous layer is treated in a small auxiliary column to recover the ester entrainer. However the increased expenditure of heat required for the operation of this auxiliary column is considerably less than that necessitated, in the absence of a supplementary entrainer, either for the dehydration of the ester forming the upper layer in the decanter or for increasing the amount of reflux of this same layer in the dehydration column.

In a general manner it suffices, to carry out the process of the present invention, to arrange above the supply of mixture to be treated, approximately ten plates charged with ester-water binary mixture, surmounted by about five plates charged with hydrocarbon-water binary mixture (or if need be with hydrocarbon-ester-water ternary mixture).

It has been stated, for ease of description, that a single column is used. It is evident that the principle of the invention is in no way changed if this column is divided into several others, provided that the connections between the columns cause them to work under conditions similar to the operation of a single column.

What I claim is:

1. A continuous process for dehydrating aqueous substances selected from the group consisting of aqueous acetic acid and aqueous mixtures of acetic acid and acetic anhydride, which process comprises introducing the aqueous substance into the middle part of a distilling zone containing predetermined proportions of ethyl acetate and petroleum distillate boiling at a temperature between 84–85° C.; heating the distilling zone at an end thereof to set up a temperature gradient from said end to the opposite end, thereby producing an automatic classification of the materials in the zone and thus forming separate sections of operation for the ethyl acetate and the petroleum distillate respectively, the petroleum distillate section being adjacent to said opposite end; withdrawing vapours from said opposite end said vapours consisting of a water portion and a non-aqueous portion; separating the non-aqueous portion and returning it to the distilling zone in the petroleum distillate section; and withdrawing anhydrous acetic material from the distilling zone at a point adjacent the heated end thereof.

2. A continuous process for dehydrating aqueous substances selected from the group consisting of aqueous acetic acid and aqueous mixtures of acetic acid and acetic anhydride, which process comprises introducing into the middle part of a distilling zone containing predetermined proportions of ethyl acetate and cyclohexane; heating the distilling zone at one end thereof to set up a temperature gradient from said end to the opposite end, thereby producing an automatic classification of the materials in the zone and thus forming separate sections of operation, one section being the operation section for the ethyl acetate alone, and another section adjacent to said opposite end being the operation section for the cyclohexane together with part of said ethyl acetate; withdrawing vapours from said opposite end, said vapours consisting of a water portion and a non-aqueous portion; separating the non-aqueous portion and returning it to the distilling zone in the second section; and withdrawing anhydrous acetic material from the distilling zone at a point adjacent the heated end thereof.

HENRI MARTIN GUINOT.